Nov. 17, 1931. W. P. DAMERON 1,832,767
AUTOMOBILE BODY
Filed Oct. 27, 1927 2 Sheets-Sheet 2

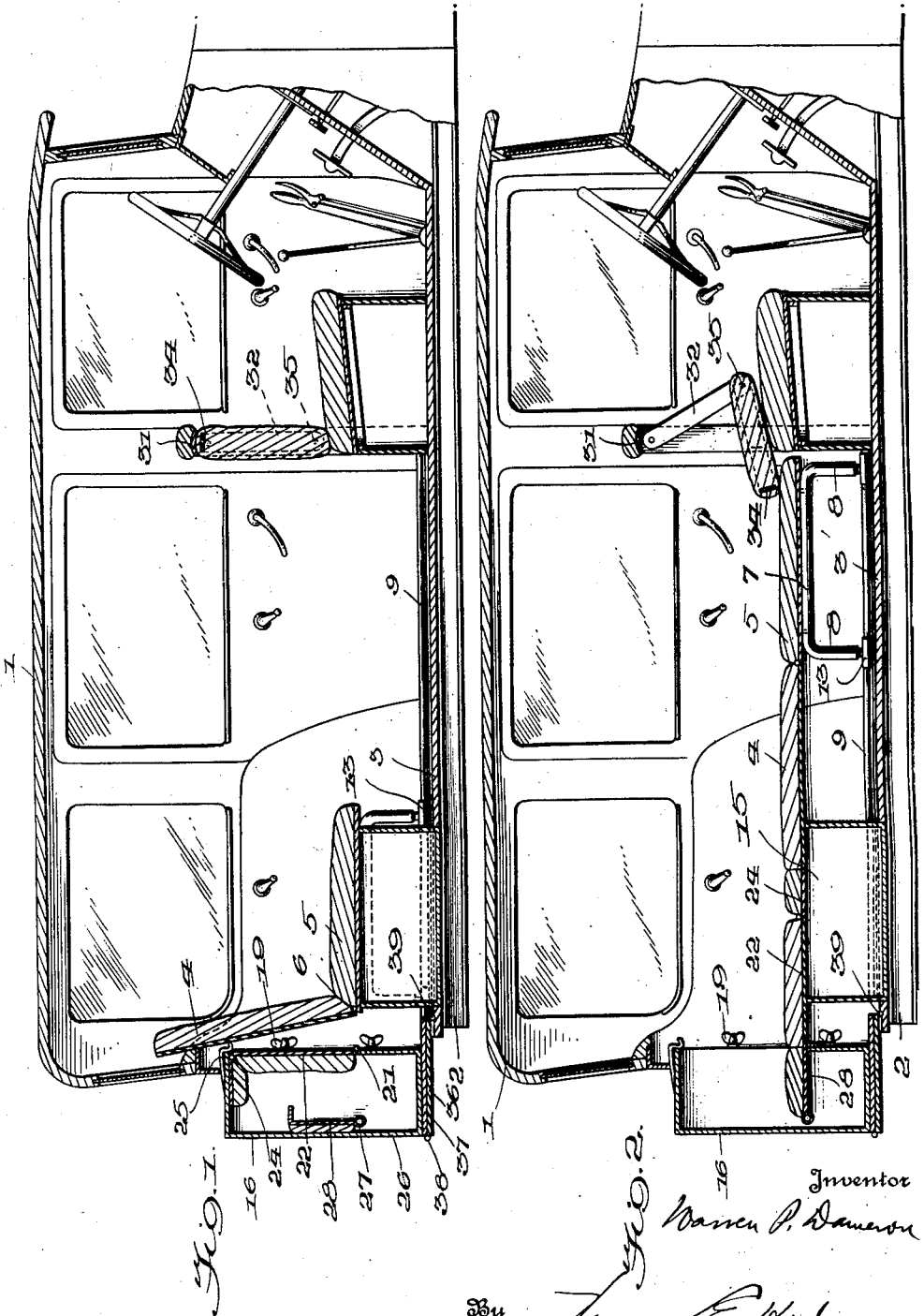

Inventor
Warren P. Dameron
By Vernon E. Hodges
his Attorney

Patented Nov. 17, 1931

1,832,767

UNITED STATES PATENT OFFICE

WARREN P. DAMERON, OF TACOMA, WASHINGTON

AUTOMOBILE BODY

Application filed October 27, 1927. Serial No. 229,172.

This invention relates to an improvement in automobile bodies.

The object of the invention is to provide an automobile body which may be converted into a bed for sleeping purposes without the inconvenience of alighting from the automobile and without the necessity for strenuous effort or labor, which is usually required to set up for use the beds ordinarily employed in connection with automobiles. It is very inconvenient, as well as undesirable, to get out of a closed automobile for instance in a rain or snow and at night to open up a bed or put up a tent in order to have suitable sleeping accommodations for the night.

This invention obviates these objections and makes them entirely unnecessary, because the bed may be very easily and quickly opened up from within the automobile and without the necessity of getting out of it for any purpose.

The invention also makes use of a trunk as applied to the back of the automobile to contain the principal parts of the bed as well as the bed clothing, etc., which may be used in connection with the bed. In this way, the trunk not only serves its function as trunk or container but it also forms a part of the bed structure and is used to contain a portion of the bed when the latter is folded up and not in use.

This makes it possible to remove from the automobile a large part of the bed itself when it is not desired to use it. This is done by merely removing the trunk, which is ordinarily attached to the back of the automobile and which may be easily and readily removable, and upon the removal of the trunk a large part of the bed and bedding is likewise removed from the body of the vehicle.

The invention also utilizes the ordinary construction of automobile bodies without any material change, except to modify the construction of the usual trunk somewhat or to substitute a new one in its place, and when the whole is completed it is practically impossible to determine from a casual inspection of the vehicle that the trunk or body may be converted into a bed. This is all concealed when folded up and merely utilizes what would otherwise be unused space. At the same time it does not add materially to the cost of the vehicle nor to its weight; on the other hand, the advantages that are derived from having a bed built into the body of a vehicle are numerous and very apparent to the large class of persons who travel about the country and are in the habit of taking their beds with them, either to be applied to the automobile itself or to be used in tents.

As above described, the bed is primarily enclosed within the usual trunk, which is removably secured to the back of the automobile body but instead of having this trunk opened at its top, the latter is closed and the inside of the trunk is openable through an opening in the back of the automobile body in order that the back seat may be slid forward on suitably designed tracks for the purpose to allow the portion of the bed inclosed within the trunk to be opened outward and cooperate with the back and seat portions of the back seat to form a bed for sleeping accommodations. In this way, the interior of the trunk itself forms a portion of the bed in actual use as well as to contain principal parts of the bed and the bedding, and this gives sufficient room in length as well as in width for the accommodation of persons using it for sleeping.

In applying the invention to automobile bodies, which are relatively short, with a smaller amount of space between the front and back seats, provision is made for reconstructing the front seat and utilize it as a portion of the bed or at least as a head rest for the sleepers.

In the accompanying drawings:—

Fig. 1 is a longitudinal sectional view of the invention incorporated in an automobile body, with the bed folded up;

Fig. 2 is a similar view showing the bed open and ready for use;

Fig. 3 is a perspective view partly in section of the front seat;

Fig. 4 is a perspective view of the trunk removed;

Fig. 5 is a perspective view of a portion of the back of the automobile body after the removal of the trunk; and Fig. 6 is a detail sectional view of a seat guide.

The numeral 1 designates the body generally, which may be either of the enclosed type or the open type. This body is mounted upon the usual channel iron frame 2, upon which is built a floor 3. The back seat of the body is provided with a back portion 4 and a seat portion 5, hinged together as at 6. This back seat is mounted upon a frame 7 provided with depending legs 8, supported as shown in Fig. 6 upon guide rails 9, which extend longitudinally of the floor 3 and are held slightly above the floor by means of the angle iron supports 10. The upper surface of each of the guides 9 is provided with a longitudinally extending groove 11, for receiving a ball 12 held within the clamp 13, which fits over the guide 9 by means of a set screw 14, which is likewise grooved on its lower end to form a race for the ball 12. It will be noted that the set screw 14 is screwed into the interior of the clamp 13 and may be adjusted therein for taking up any wear between the ball and the groove 11. The clamp 13 is screwed into the leg 8 of the back seat supporting frame-work, as shown in Fig. 6.

The usual tool-box or compartment 15 is provided in the back portion of the automobile body, as shown in Figs. 1 and 2, and normally adapted to be positioned beneath the seat portion 5 of the back seat.

An automobile trunk 16 is adapted to be secured to the back portion of the automobile body 1 and in order to receive this trunk a portion of the body immediately behind the back seat is cut away and the trunk 16 fits neatly within this cutaway portion, being provided with flanges 17 on opposite sides thereof, through which extend bolts 18 which are adapted to extend through a portion of the body and receive suitable wing nuts 19 for holding the trunk removably in its proper position in the back of the body.

It will be noted by referring to Fig. 4 that the trunk is of a form usually employed and adapted to be attached to the back of the automobile body but that instead of being open along its upper edge, the trunk is, on the other hand, open on its inner side. Hinged to the inner wall 20 of the trunk, as at 21, is a panel 22 to which is likewise hinged as at 23 a section 24. This panel and section are suitably padded, as desired and as shown in the drawings, to make them comfortable for sleeping. In the folded position shown in Fig. 1, the section 24 is adapted to be folded back upon the panel 22, and the panel serves to close the open side of the trunk 16, being held in this position by the spring catch 25. Hinged to the outer wall 26 of the trunk as at 27 is a shelf 28 likewise padded, as shown in the drawings.

This shelf is provided with a downturned portion 29 adapted to fit into a cut-out portion 30 of the panel 22, when the bed is opened up and the parts are in their open position, as shown in Fig. 2.

In the construction of the automobile body, the front seat may either be made in its rigid form as ordinarily provided or it may be reconstructed to form an extension of the bed or a head rest therefor. In the latter form, the front seat may be constructed, as shown in Fig. 3, in which it has its main frame 31 which extends therearound and is connected with the sides and floor of the body. To this frame 31 on opposite sides thereof links 32 are pivoted as at 33 and extend downwardly from the upper portion thereof having a frame 34 pivoted thereto as at 35. The frames 31 and 34 may be upholstered, as desired, to form a suitable and comfortable riding seat. In this way, the back of the seat is made so as to swing from the position shown in Fig. 1 to the position shown in Fig. 2, where it may be utilized to form a head rest for the bed whenever this is desired.

In the normal use of the automobile body for pleasure purposes, the trunk will be attached to the back of the body, as shown in Fig. 1, with the bed and parts folded up as illustrated. When it is desired to open the bed for use all that is necessary is to slide the back seat forward into the position shown in Fig. 2 along the guides 9 and fold down the back 4 to where it rests upon the tool-box or compartment 15. Then it is a very easy and simple matter to release the catch 25 and lower the panel 22, folding this panel and the section 24 down to the position shown in Fig. 2. The shelf 28 is then lowered and the bed is then ready for use. The compartment formed in the bottom of the trunk beneath the shelf 28 may be used to contain the bed clothing and other articles if desired.

To open the front seat into the position shown in Fig. 2, it is merely necessary to swing the lower edge thereof forward by means of the links 32 and the upper edge is then freely and easily allowed to drop out of frictional engagement with the upper portion of the frame 31 and may be placed in a comfortable and convenient position for use and to form a head rest for the bed.

It is very evident therefore that the bed may be opened up for use very easily and quickly and by a very simple operation and without the necessity of alighting from the interior of the automobile. The whole operation may be performed from the interior, which is often very desirable, especially where the bed is opened up for use at night or during a rain or snow.

The usual shades now customarily provided in closed cars serve to close the windows from exterior inspection and, if desired, the dome light may be used to suitably light the entire interior of the body.

The trunk may be removed when it is desired not to use the bed and for this purpose the back of the body may be provided with folded sections 36 and 37 hinged together as at 38 and to the floor of the body, as at 39. These sections are normally folded up beneath the trunk 16, as shown in Figs. 1 and 2, where they serve as a support for the trunk, but after removal of the trunk they may be opened up into the position shown in Fig. 5 and close the opening formed in the back of the body.

In order to cover the guide rails 9 when the back seat is in the position shown in Fig. 1, a guard 40 is hinged to the floor or to the supporting member 10, as shown in Fig. 6, and is preferably made of an angle construction, so as to swing over the guide rail 9 to cover this rail and prevent the accumulation of any foreign substance thereon or in the groove 11, which might retard or appreciably prevent the easy actuation or opening of the bed. This guard 40 may also swing over the rail terminating at a point immediately in front of the foremost clamps 13, so as to lock the back seat in its proper position, holding it against any sliding movement forward.

I claim:—

1. The combination with an automobile body having an opening in the back portion thereof, of a trunk attached to the body adjacent said opening and having the outer sides and top thereof closed and provided with an opening in the inner side communicating with the opening in the body, a shelf pivotally mounted in the trunk, and sections pivotally connected together and to the side of the trunk and extending approximately in alignment with the shelf and outwardly from the side opening and into the body in operative position forming a bed therein.

2. An automobile body having an opening through the rear end thereof, a compartment forming an extension of said body and communicating with the interior of the body through said opening, means normally folded in the compartment and extensible therefrom in unfolded position through the opening to be disposed in the body and means in the compartment cooperating with the last-mentioned means when unfolded to receive bedding.

3. An automobile body having an opening, through the rear end thereof, a seat arranged within the body, means for sliding the seat forward within the body with the seat and back portion approximately in horizontal alignment, a compartment forming an extension of said body and communicating with the interior of the body through the opening, means normally folded in the compartment and extensible therefrom in unfolded position through the opening to be disposed in the body approximately in horizontal alignment with the seat and means in the compartment cooperating with the last mentioned means when unfolded, and the seat to receive bedding.

In testimony whereof I affix my signature.
WARREN P. DAMERON.